(12) United States Patent  
Villeroy De Galhau et al.

(10) Patent No.: US 9,394,192 B2  
(45) Date of Patent: Jul. 19, 2016

(54) BATCH-CHARGING MACHINE WITH REMOVABLE HEAD FOR SUBMERGED BATCH-CHARGING

(71) Applicant: SAINT-GOBAIN ISOVER, Courbevoie (FR)

(72) Inventors: Gregoire Villeroy De Galhau, Paris (FR); Yannick Lefrere, Malakoff (FR); Mathieu Rayer, Paris (FR)

(73) Assignee: SAINT-GOBAIN ISOVER, Courbevoie (FR)

( * ) Notice: Subject to any disclaimer, the term of this patent is extended or adjusted under 35 U.S.C. 154(b) by 53 days.

(21) Appl. No.: 14/382,980

(22) PCT Filed: Mar. 4, 2013

(86) PCT No.: PCT/FR2013/050459  
§ 371 (c)(1),  
(2) Date: Sep. 4, 2014

(87) PCT Pub. No.: WO2013/132184  
PCT Pub. Date: Sep. 12, 2013

(65) Prior Publication Data  
US 2015/0013386 A1    Jan. 15, 2015

(30) Foreign Application Priority Data  
Mar. 5, 2012 (FR) ..................... 12 51966

(51) Int. Cl.  
*C03B 3/00* (2006.01)  
*C03B 5/00* (2006.01)  
*C03B 5/235* (2006.01)  
*F27D 3/08* (2006.01)

(52) U.S. Cl.  
CPC . *C03B 3/005* (2013.01); *C03B 3/00* (2013.01); *C03B 5/005* (2013.01); *C03B 5/2353* (2013.01); *C03B 5/2356* (2013.01); *F27D 3/08* (2013.01)

(58) Field of Classification Search  
CPC .................................. C03B 3/00; C03B 3/005  
USPC ........................................ 65/135.9  
See application file for complete search history.

(56) References Cited

U.S. PATENT DOCUMENTS 1,761,229 A    6/1930  Pedersen  
1,834,631 A  * 12/1931  Mulholland ............. C03B 3/02  
                                                                 414/197

(Continued)

FOREIGN PATENT DOCUMENTS

WO    WO 99/35099 A1    7/1999

OTHER PUBLICATIONS

International Search Report issued Jun. 6, 2013, in PCT/FR13/050459 filed Mar. 4, 2013.

*Primary Examiner* — Matthew Daniels  
*Assistant Examiner* — Cynthia Szewczyk  
(74) *Attorney, Agent, or Firm* — Oblon, McClelland, Maier & Neustadt, L.L.P.

(57) ABSTRACT

A batch charger for charging batch materials into a glass melting furnace at a level located below the level of the molten glass, including: a body including a barrel and a mechanical system for conveying batch materials, the mechanical system being housed in the barrel; and a head removably fastened to an end of the barrel, and including a slide gate damper, and a tubular connecting part fastened to the slide gate damper and configured to be at least partially inserted into a charging orifice provided in a wall of a tank of the furnace, the slide gate damper and the connecting part including a system of internal ducts that can be connected to a source of coolant. A melting installation and a process can use such a batch charger.

20 Claims, 2 Drawing Sheets

(56) References Cited

U.S. PATENT DOCUMENTS

| | | | | |
|---|---|---|---|---|
| 2,262,070 A | * | 11/1941 | Turk | C03B 3/00 236/15 R |
| 2,354,807 A | * | 8/1944 | Fox | C03B 3/005 266/183 |
| 2,479,805 A | | 8/1949 | Batchell | |
| 3,573,017 A | * | 3/1971 | Griem | C03B 3/00 65/162 |
| 3,725,022 A | * | 4/1973 | Mills | C03C 1/026 414/161 |
| 4,226,564 A | * | 10/1980 | Takahashi | C03B 3/00 414/166 |
| 4,290,797 A | | 9/1981 | Rossi | |
| 6,460,376 B1 | | 10/2002 | Jeanvoine et al. | |
| 2003/0029197 A1 | | 2/2003 | Jeanvoine et al. | |
| 2004/0206124 A1 | | 10/2004 | Jeanvoine et al. | |
| 2009/0044567 A1 | * | 2/2009 | Johnson | C03B 5/245 65/29.17 |
| 2013/0174611 A1 | * | 7/2013 | MacLeod | C03B 5/167 65/355 |

* cited by examiner

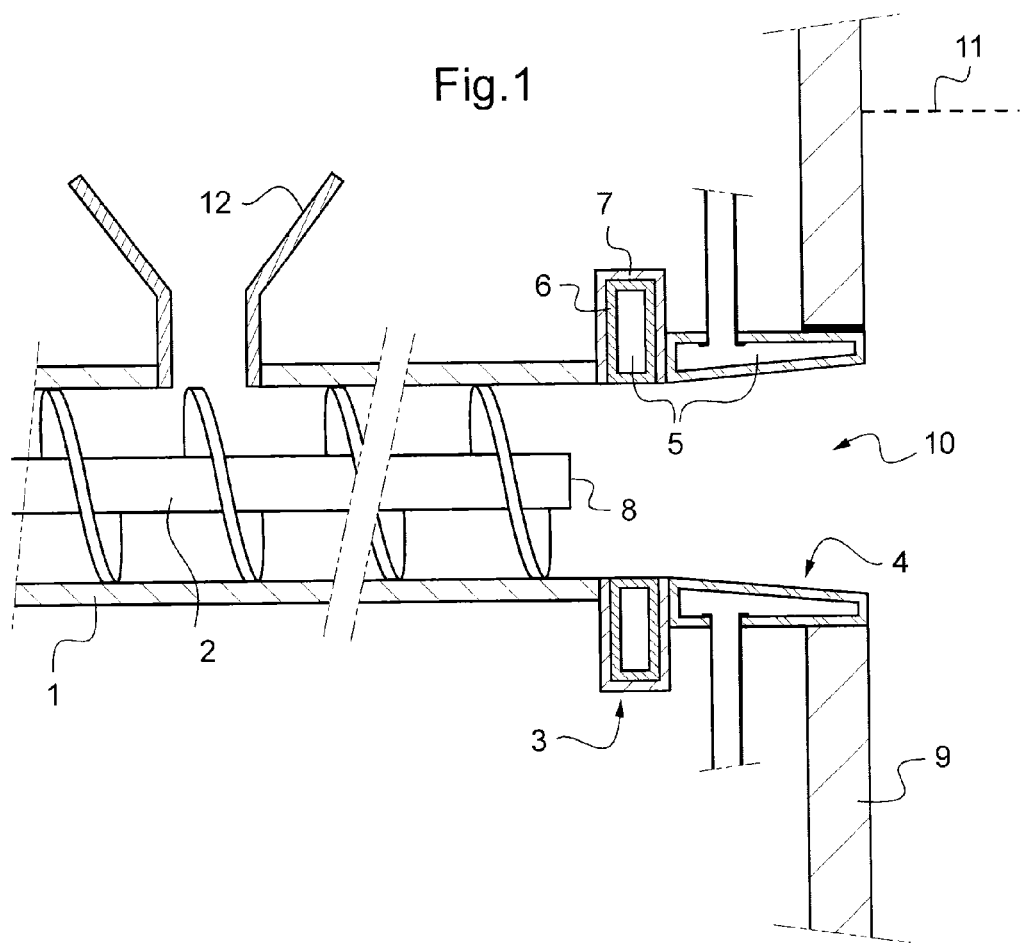

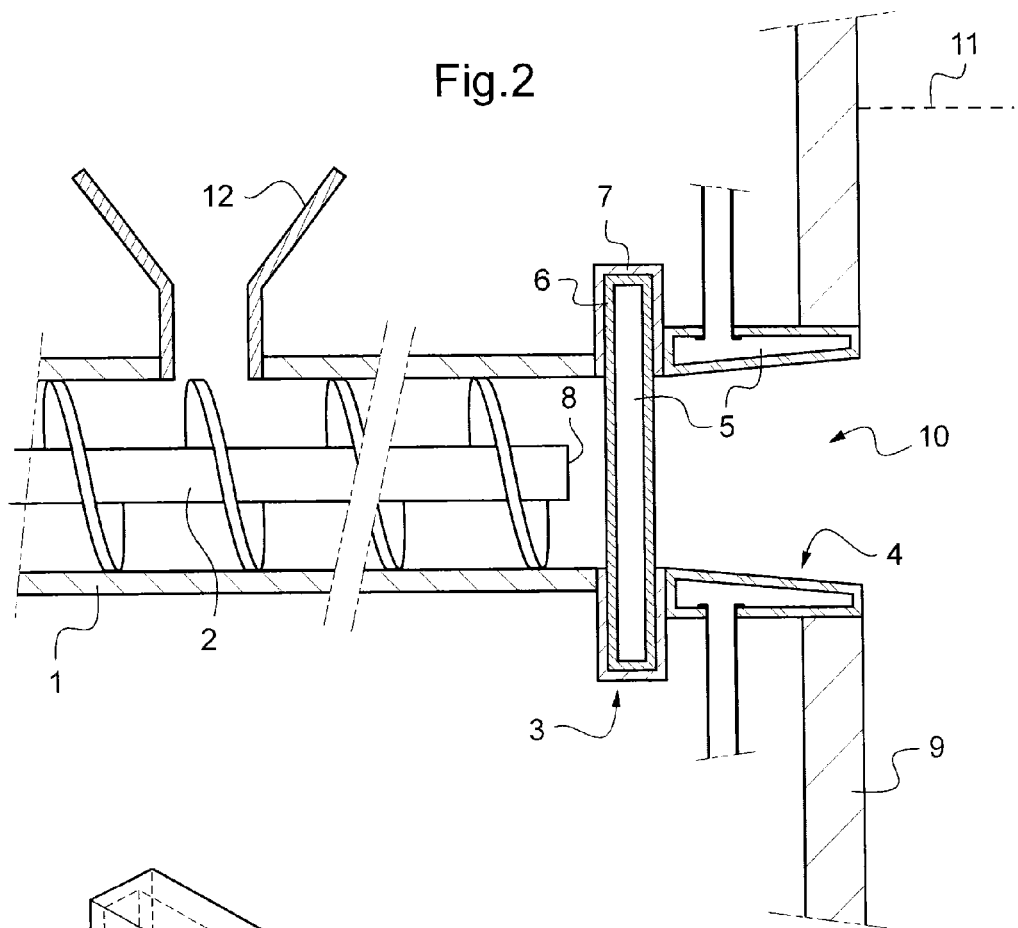
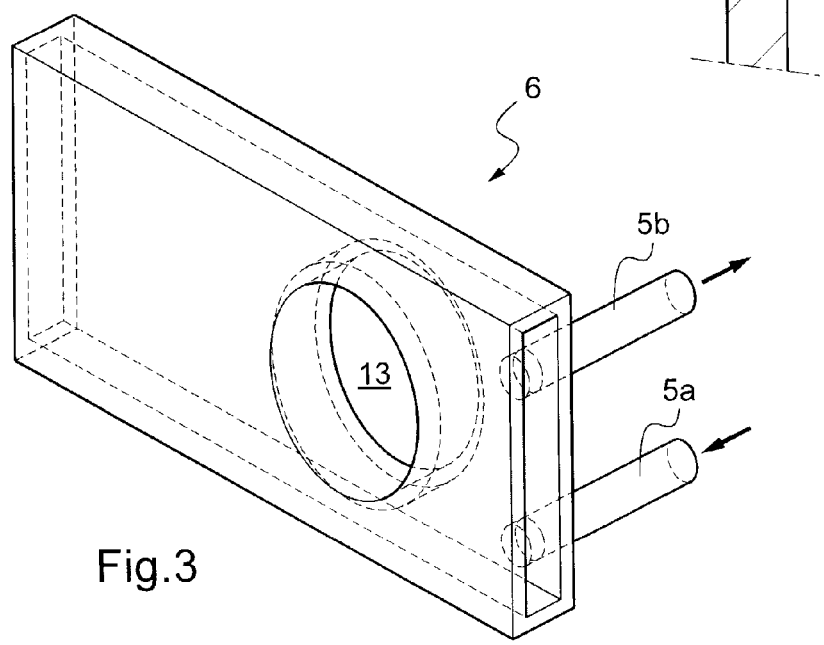

BATCH-CHARGING MACHINE WITH REMOVABLE HEAD FOR SUBMERGED BATCH-CHARGING

The present invention relates to a batch material charger comprising a head formed by a removable slide gate damper, to an installation for melting glass comprising such a batch charger, and to a process for melting glass using such an installation.

In a glass furnace, the charging of batch materials is conventionally achieved by depositing these materials onto the glass bath. In a furnace with conventional burners, located above the level of the glass, it is necessary to wet the batch materials to prevent them from being carried away by hot furnace gases (see for example U.S. Pat. Nos. 3,725,022 and 6,349,570). However, this prewetting has a non-negligible cost in terms of power consumption, due to evaporation of the water used.

It is moreover known to recycle mineral fibers containing organic components (organic binder). However, this recycling requires that the organic components be removed beforehand, generally by combustion, at the very latest in the batch charger (see for example EP 2 072 474). However, such precombustion, immediately upstream of the furnace, prevents wetting of the fibrous materials to be recycled before they are fed into the furnace.

The aim of the present invention is to provide a process and installation for melting glass, allowing problems related to dusting of the batch materials to be overcome, without any prewetting, and this even for batch materials for recycling, such as mineral wool, containing a large fraction of organic materials. In the process of the present invention, it is not necessary to subject the batch materials to be recycled to a precombustion step intended to remove the organic components. By virtue of the process of the present invention, glass wool or rock wool containing an organic binder, even in large proportions, may be fed into the furnace as such, i.e. without precombustion or prewetting.

This aim is achieved in the present invention by virtue of the combined use of:
- a particular charging method involving charging below the level of the bath of molten material, referred to hereafter as "charging at depth" or "submerged charging"; and
- submerged burners, allowing combustion of the organic components introduced with the batch materials to be recycled, in the very heart of the molten glass.

Charging batch materials at depth very substantially limits dusting to amounts that are acceptable for the process. The organic components of the batch materials for recycling are no longer considered as a problematic ingredient to be removed before melting, but are valued as a fuel that improves the energy budget of the process. Specifically, when the organic materials (paper, adhesive, polymer binder) introduced with batch materials for recycling make contact with the bath of hot glass, a pyrolysis reaction occurs and the pyrolysis gases burn on contact with oxygen. This oxygen may originate from oxides in the glass bath and consumption of this oxygen then leads to reduction of the glass bath. Otherwise it may be present in the atmosphere above the bath of molten glass. Of course, when the fraction of organic materials is large, it is possible to supply oxygen in consequence, for example via oxygen bubblers or oxidizing chemical agents.

The energy budget of the glass melting process of the present invention is also improved by the absence of prewetting of the fibrous or particulate batch materials.

The use of the organic components introduced with the batch materials as a fuel thus theoretically allows the gaseous fuel (natural gas) that conventionally powers submerged burners to be completely replaced with liquid or solid fuels, for example organic waste or biomass.

However, the submerged charging of the present invention generates constraints and leads to problems with safety. The existence of an aperture in the wall of the tank of the furnace below the level of the molten glass creates a risk of leaks if the sealing system fails. Moreover, if the batch charger fails, any work on the latter would require the furnace to be stopped and emptied. Finally, the batch charger is subjected to thermal stresses that are considerably higher than those endured by a conventional charger charging above the level of the glass bath.

In the present invention, these technical problems resulting from the submerged charging of batch materials have been solved by virtue of a novel batch charger, particularly suited to the process of the present invention. This batch charger comprises a removable head formed by a slide gate damper, at least the mobile part (slide gate) of which is passed through by a system of internal ducts for flowing a coolant. The slide gate damper allows the charging aperture to be closed simply and rapidly without stopping the furnace or emptying the tank beforehand. Active cooling of the slide gate of the damper, after closure, results in the formation of a protective crust of solid material and prevents thermal degradation of the head of the batch charger.

The removable nature of the batch charger head allows the batch charger of an installation with a full tank to be rapidly removed and/or replaced. Lastly, inserting the cooled head of the batch charger between the tank wall and the nose of the batch charger distances the latter from the bath of molten glass and shelters it from excessive thermal stresses.

The present invention thus relates to a batch charger for charging batch materials into a glass melting furnace at a level located below the level of the molten glass, comprising:
- a body with a barrel and a mechanical system for conveying batch materials, said system being housed in said barrel;
- a head with a slide gate damper, this head being removably fastened to the end of the barrel; and
- a tubular connecting part fastened to the slide gate damper and intended to be at least partially inserted into the charging orifice provided in the wall of the tank of the furnace, the slide gate damper and the connecting part comprising a system of internal ducts that can be connected to a source of coolant.

The body of the batch charger of the present invention, i.e. the barrel containing a mechanical system for conveying the batch materials, does not have any particular technical features. The mechanical system for conveying the batch materials may for example be a piston or one or more worm screws, the body of the batch charger then for example being a conventional single-screw or twin-screw extruder.

By virtue of the system for cooling the head of the batch charger, the body does not need to be actively cooled in order to be protected from the heat of the furnace. In a preferred embodiment of the invention, neither the barrel nor the mechanical system for conveying the batch materials therefore comprise an active cooling system, such as a system of ducts that can be to connected to a source of coolant.

The devices supplying the batch charger are also known (hopper, secondary extruder, etc.). The batch charger furthermore preferably has at least one inlet orifice, located upstream or downstream of the device for introducing the batch materials, which orifice will serve to supply a flow of inert gas (for example nitrogen) during operation. This inert gas flow is intended to purge oxygen and prevent premature combustion of organic components in the body of the batch charger.

As explained above, the head of the batch charger comprises a slide gate damper, preferably fastened directly to the nose of the batch charger, and a tubular connecting part fastened to the slide gate damper. The tubular connecting part is preferably approximately coaxial with the worm screw, i.e. the axis of rotation of the worm screw is superposed on the axis of symmetry of the cross section of the tube. The outside surface of the connecting part is preferably substantially cylindrical and will be inserted in the charging orifice in the tank wall. It goes without saying that the outside diameter of the connecting part must for this reason differ very little from the diameter of the charging orifice, so as to make sealing this connection easier. This seal is achieved by the layer of solidified glass that forms on the actively cooled connecting part.

The inside surface of the tubular connecting part is preferably not strictly cylindrical but flares slightly in the direction of the furnace. The connecting part preferably has a substantially conical inside surface (truncated cone), which cone widens from the end making contact with the slide gate damper to the end a distance away from said damper. This widening or flare is mainly intended to prevent partially molten batch materials forming a blockage and plugging the opening of the connecting part, preventing uniform and clump free feeding of the batch materials.

The degree of widening, or the opening angle, of the truncated cone of the inside surface of the connecting part is preferably between 7 and 13°, in particular between 8 and 12°, and ideally between 9 and 10°.

The damper is located between the end of the barrel and the connecting part, said damper forming an essential part of the batch charger of the present invention. This damper comprises a fixed part and a moveable part (slide gate).

The fixed part of the damper is removably fastened to the barrel of the batch charger. The aperture of the damper is preferably circular with a diameter near that of the inside diameter of the tubular connecting part, these two parts thus forming a smooth "charging channel" through which the batch materials can pass without a risk of blockage.

Moreover, the inside diameter of the tubular connecting part preferably differs from the inside diameter of the barrel of the batch charger by 20% at most, in particular by 10% at most, and ideally by less than 5%.

At least the moveable part of the damper comprises a system of internal ducts that can be connected to a source of coolant. During the glass melting process of the present invention, a coolant is made to flow, preferably continuously, through the system of internal ducts of the slide gate and tubular connecting part. It is of course also possible to cool the fixed part of the slide gate damper by means of a system of internal ducts. Such cooling is however not essential when the cooling systems of the two other parts (moveable part, connecting part) are effectual. Although active cooling of the moveable part is in principle only essential when the damper is closed, it is preferable for it to be cooled even when it is in the open state in order to enable a very rapid closure and to make it impossible to forget to turn on the cooling system, which could prove to be detrimental.

In order to ensure that it is possible to rapidly close the damper when required, it is important that, during operation, the tip of the worm screw of the batch charger does not extend beyond the barrel and does not cut the plane of closure of the slide gate damper.

However, a mechanical system could advantageously be designed allowing the worm screw to be slid forward and backward in the barrel, in order to allow any batch materials that were to block the charging channel, during charging or after closure and reopening of the slide gate damper, to be forcefully pushed out.

The present invention also relates to an installation for melting glass, comprising a batch charger, such as described above, and a glass melting furnace with a charging orifice located in the wall of the tank of the furnace below the theoretical level of the glass, which level is defined by the position of the spillway of the molten material. The tubular connecting part of the batch charger is at least partially inserted in the charging orifice of the furnace.

The glass melting furnace of the installation may be heated using known heating means such as roof-mounted burners, mechanical resistors, electrodes or submerged burners.

In a preferred embodiment, the glass melting installation comprises submerged burners supplied with an air/gaseous fuel (for example natural gas) mixture or by an oxygen/gaseous fuel mixture. The oxygen/fuel molar ratio may be superstoichiometric, the amount of oxygen in excess possibly being adjusted so as to supply the oxygen required to combust the pyrolysis gases formed in the charging zone.

Finally, the invention relates to a process for melting glass using an installation such as described above.

Such a glass melting process comprises:
  feeding batch materials into a glass melting furnace through a charging orifice located in the wall of the tank of the furnace, below the level of the molten glass, by means of a batch charger according to the invention, the head of the batch charger being connected by the tubular connecting part to the charging orifice so that the batch materials enter into the furnace, via the open slide gate damper and the tubular connecting part, at a level located below the level of the molten glass; and
  cooling the head of the batch charger by flowing a coolant through the systems of internal ducts of the slide gate damper, in particular of the moveable part of the latter, and of the connecting part.

The glass melting process is a continuous process. The feeding of batch materials and the cooling are therefore implemented simultaneously and preferably continuously by virtue of a continuous supply of batch materials and coolant.

If required, for example if the batch charger becomes blocked or malfunctions, the presence of the removable slide gate damper allows the to batch charger to be disconnected without the furnace needing to be stopped and emptied. The process of the present invention then comprises closing the slide gate damper and separating the body of the batch charger from the head of the latter, the head remaining securely fastened to the furnace.

In the case where the moveable part of the slide gate damper is not actively cooled when the damper is open, the closing step must of course be preceded by or concomitant with the initiation of the active cooling, a coolant being made to flow. After closure, the cooled slide gate is rapidly covered with a layer of solidified glass, which forms an effective thermal insulation means between the bath of molten glass and the slide gate.

The batch materials fed into the melting installation of the present invention are advantageously, at least in part, batch materials for recycling, such as mineral fibers or broken glass obtained from household waste. Most recyclable waste contains a certain fraction of organic materials that do not need to be removed beforehand. The materials for recycling are preferably mineral fibers, optionally bound with an organic binder.

By virtue of the particular structure of the batch charger and the charging method, the materials for recycling can make up as much as 100% of the batch materials. They represent at least 10% and preferably from 20 to 80% of all of the batch materials.

The composition of the batch materials advantageously contains at least 2 wt %, preferably 5 wt % to 50 wt %, and in particular from 10 wt % to 40 wt %, of organic components, this percentage being relative to the total weight of mineral and organic materials supplied to the batch charger.

Although the process according to the invention can be implemented with wet batch materials containing as much as 50 wt % water, one of its advantages is that it is in fact not necessary to wet the batch materials with the aim of reducing or preventing dusting of the particles and fibers (see introduction). In a preferred embodiment of the process according to the invention, the composition of the batch materials therefore contains less than 5% water and preferably less than 3% water.

The present invention is now illustrated and explained in greater detail with reference to the appended figures, in which:

FIG. 1 shows a cross section through a batch charger comprising a removable head according to the invention, the head being inserted into the tank wall of a glass melting furnace that is charged at depth, in the open position;

FIG. 2 shows a cross section through the same batch charger, in the closed position; and FIG. 3 is a perspective view of the moveable part of the slide gate damper of the batch charger in FIGS. 1 and 2.

More particularly, FIG. 2 shows the body of a batch charger comprising a barrel 1 and a worm screw 2 housed in the barrel. A hopper 12 on the barrel allows batch materials (vitrifiable materials and organic components) to be fed into the barrel. The head of the batch charger comprises a slide gate damper 3 and a tubular connecting part 4. The slide gate damper comprises a fixed part 7 and a moveable part 6, called the slide gate. A tubular connecting part 4, the inside surface of which flares slightly in the direction of the furnace (only the tank wall 9 of which is shown), is fastened to the fixed part 7 of the damper 3. The tubular connecting part 4 is inserted into a charging orifice 10. The connecting part 4 and the slide gate 6 of the damper 3 are each intersected by a system of internal ducts 5 so that a coolant can be made to flow therethrough. In FIG. 1 the slide gate 6 is in the open position, i.e. its circular aperture is superposed on the circular cross section of the barrel 1 and the circular cross section of the connecting part 4, thus defining a channel for charging batch materials, which channel opens onto the charging orifice 10. The theoretical level of the glass bath 11 is shown by a dotted line.

FIG. 2 is identical in every way to FIG. 1 except that the moveable part 6 (slide gate) is closed, thus cutting-off the inside of the barrel 1 from the opening of the connecting part 4, and therefore from the inside of the furnace.

FIG. 3 shows the moveable part 6 separated from the fixed part of the damper and the rest of the batch charger. This moveable part 6, or slide gate, is a hollow metal plate comprising, in one half, a circular aperture 13. An inlet first duct 5a and an outlet second duct 5b communicate with the cavity in the hollow metal plate and form a system of internal ducts for flowing a coolant.

The invention claimed is:

1. A batch charger for charging batch materials into a glass melting furnace at a level located below a level of molten glass, comprising:
   a body including a barrel and a mechanical conveying system for conveying batch materials, the mechanical system being housed in the barrel;
   a head removably fastened to an end of the barrel, including a slide gate damper, and a tubular connecting part fastened to the slide gate damper and configured to be at least partially inserted into a charging orifice provided in a wall of a tank of the furnace,
   the slide gate damper and the connecting part comprising a system of internal ducts that can be connected to a source of coolant.

2. The batch charger as claimed in claim 1, wherein the mechanical conveying system is a piston or a worm screw.

3. The batch charger as claimed in claim 2, configured so that, during operation, a tip of the worm screw does not extend beyond the barrel and does not cut a plane of closure of the slide gate damper.

4. The batch charger as claimed in claim 1, wherein the tubular connecting part has a substantially conical inside surface that flares from an end making contact with the slide gate damper to an end a distance away from the slide gate damper.

5. The batch charger as claimed in claim 4, wherein an opening angle of a truncated cone of the substantially conical inside surface of the connecting part is between 7 and 13°.

6. The batch charger as claimed in claim 4, wherein an opening angle of a truncated cone of the substantially conical inside surface of the connecting part is between 8 and 12°.

7. The batch charger as claimed in claim 4, wherein an opening angle of a truncated cone of the substantially conical inside surface of the connecting part is between 9 and 10°.

8. The batch charger as claimed in claim 1, wherein the slide gate damper comprises a fixed part and a moveable part, at least the moveable part comprising a system of internal ducts that can be connected to a source of coolant.

9. The batch charger as claimed in claim 1, wherein neither the barrel nor the mechanical conveying system comprise an active cooling system nor a system of ducts that can be connected to a source of coolant.

10. The batch charger as claimed in claim 1, wherein an inside diameter of the tubular connecting part differs from an inside diameter of the barrel of the batch charger by 20% at most.

11. The batch charger as claimed in claim 1, wherein an inside diameter of the tubular connecting part differs from an inside diameter of the barrel of the batch charger by 10% at most.

12. An installation for melting glass, comprising:
   a glass melting furnace with a charging orifice located in a wall of tank of a furnace below a theoretical level of a glass, which theoretical level is defined by a position of a spillway of molten material; and
   a batch charger according to claim 1,
   the connecting part of the batch charger being at least partially inserted in the charging orifice of the furnace.

13. The installation for melting glass as claimed in claim 12, further comprising submerged burners.

14. A melting process using the installation for melting glass as claimed in claim 12, said melting process comprising:
   feeding, or continuously feeding, batch materials into the glass melting furnace through the charging orifice located in a wall of a tank of a furnace, below the level of the molten glass, by the batch charger, a head of the batch charger being connected by the tubular connecting part to the charging orifice so that the batch materials enter into the furnace, via the open slide gate damper and the tubular connecting part, at a level located below the level of the molten glass; and cooling, or continuously cooling, the head of the batch charger by flowing a coolant through the systems of internal ducts of the slide gate damper and the connecting part.

15. The glass melting process as claimed in claim 14, further comprising, when required, closing the slide gate damper and separating the body of the batch charger from the head of the batch charger, the head remaining securely fastened to the furnace.

16. The glass melting process as claimed in claim 14, wherein the batch materials comprise materials for recycling.

17. The glass melting process as claimed in claim 16, wherein the batch materials comprise mineral fibers.

18. The glass melting process as claimed in claim 14, wherein a composition of the batch materials contains at least 2 wt % of organic components.

19. The glass melting process as claimed in claim 14, wherein a composition of the batch materials contains at least 5 wt % to 50 wt % of organic components.

20. The glass melting process as claimed in claim 14, wherein a composition of the batch materials contains at least 10 wt % to 40 wt %, of organic components.

\* \* \* \* \*